United States Patent [19]
Cheon

[11] Patent Number: 5,450,003
[45] Date of Patent: Sep. 12, 1995

[54] POWER-SUPPLY CONTROL SYSTEM FOR A PORTABLE DATA PROCESSOR AND METHOD FOR DRIVING THE SAME

[75] Inventor: Kyung Y. Cheon, Kyungki-do, Rep. of Korea

[73] Assignee: Samsung Electronics Co., Ltd., Kyungki-do, Rep. of Korea

[21] Appl. No.: 230,936

[22] Filed: Apr. 21, 1994

[30] Foreign Application Priority Data

Apr. 21, 1993 [KR] Rep. of Korea ............... 93-6736

[51] Int. Cl.⁶ .................................... G05F 1/40
[52] U.S. Cl. .............................. 323/272; 364/492
[58] Field of Search ............... 323/268, 272, 350, 351; 307/46, 48, 66, 82; 364/492, 493; 371/66; 395/750

[56] References Cited

U.S. PATENT DOCUMENTS

| | | | |
|---|---|---|---|
| 4,074,182 | 2/1978 | Weischedel | 323/272 |
| 4,611,289 | 9/1986 | Coppola | 364/492 |
| 5,012,406 | 4/1991 | Martin | 371/66 |
| 5,021,679 | 6/1991 | Fairbanks et al. | 307/66 |
| 5,230,074 | 7/1993 | Canova, Jr. et al. | 395/750 |
| 5,270,946 | 12/1993 | Shibasaki et al. | 364/492 |
| 5,300,874 | 4/1994 | Shimamoto et al. | 395/750 |

*Primary Examiner*—Steven L. Stephan
*Assistant Examiner*—Matthew V. Nguyen
*Attorney, Agent, or Firm*—Cushman Darby & Cushman

[57] ABSTRACT

The present invention discloses a power supply system for a portable data processor and a method for controlling the system. The power supply system includes a main DC/DC converter and an auxiliary DC/DC converter for operating in a low power consumption mode, a suspended mode, and a normal mode. Low voltage cut off circuits are provided to disable the main and auxiliary converters if the main and backup batteries are unable to provide a sufficient voltage level. This system offers increased efficiency and prevents the batteries from being overdischarged. Further, the function of turning power on is performed by the user's operation of a suspend/resume switch, and the function of turning power off may be performed by software to reduce the number of power switches.

15 Claims, 3 Drawing Sheets

POWER-SUPPLY CONTROL SYSTEM FOR A PORTABLE DATA PROCESSOR AND METHOD FOR DRIVING THE SAME

BACKGROUND OF THE INVENTION (1) Field of the Invention

This invention relates to a power-supply control system for a portable data processor and a method for driving the same. More particularly, the invention relates to a power-supply control system for a portable data processor having a suspended operation mode and a normal operation mode, in order to increase efficiency.

(2) Description of the Related Art

Portable data processors such as notebook size personal computers or small-sized word processors are widely used. Conventional portable data processors require a battery, which may be a charging battery or a general battery, and a power-supply control system to increase the life span of the battery by efficiently controlling power consumption.

FIG. 1 is a circuit diagram of a known power-supply control system for a conventional portable data processor. The power-supply control system includes a main battery 20; a back-up battery 30; diode D12 connected between the output terminals of the main battery 20 and the back-up battery 30; diode D11 and resistance R11 connected in series between the anode and cathode of diode D12; a power switch S11 for selectively connecting the main battery 20 with a regulator 40 and a DC/DC converter 70; a suspend/resume converting switch S12 for selectively operating a suspend/resume signal generator 50; a power management system 60 having an input terminals connected to the output of suspend/resume signal generator 50 and the regulator 40; a suspend logic circuit 80 which receives the output of DC/DC converter 70; and a switch 90 for selectively connecting the DC/DC converter 70 and with a normal logic circuit 100.

In operation, if a user turns on the power-on switch S11 and the main battery 20 is installed in the system, power is applied to the regulator 40 and DC/DC converter 70 from the main battery 20. If the main battery 20 is not installed in the system or is unable to provide adequate power, power is applied to the regulator 40 and DC/DC converter 70 from the back-up battery 30. Regulator 40 ensures that a constant voltage is applied to the power management system 60.

The power management system outputs the power-on signal +5 VON to enable the DC/DC converter 70 and suspend signal SPEND to operate switch 90.

The DC/DC converter 70 adjusts and stabilizes the direct current voltage supplied by the main battery 20 or the back-up battery 30, and then supplies a stable system voltage to the suspend only logic circuit 80 for suspended operation and to normal logic circuit 100 for normal operation.

A user desiring to resume work on the portable data processor at a later time may operate the suspend/resume converting switch S12 to cause the power management system 60 to output a suspend signal SPEND to turn off the switch 90.

Alternatively, the power management system 60 may sense that the user has not worked on the portable data processor for a predetermined period of time. If so, the power management system 60 outputs the suspend signal SPEND signal to turn off the switch 90.

If switch 90 is turned off, the DC voltage applied to the normal logic circuit 100 from the DC/DC converter 70 is cut off, and the portable data processor operates in a suspend mode. Accordingly, such a system may reduce power consumption by the amount of the driving power of the normal logic circuit 100.

If the suspend/resume converting switch S12 is operated when the user resumes work on the portable data processor, a resume signal is produced by the suspend/resume signal generator 50, and output to the power management system 60. The power management system 60 then disengages the suspend signal SPEND so that the switch 90 is turned on. Once the switch 90 is turned on, the DC current is applied to the normal logic circuit 100 to operate the portable data processor normally.

In this arrangement, the power-supply control system of the conventional portable data processor drives the suspend only logic circuit 80 in a suspend mode, and drives the suspend only logic circuit 80 and normal logic circuit 100 in a normal operation mode. Thus, the overall efficiency of the data processor is reduced.

Further, the conventional power-supply control system attempts to operate in the normal mode, even if the main battery 20 is not connected, or if the main battery 20 and the back-up battery 30 are completely discharged. The life span of the main battery 20 and back-up battery 30 may thus be reduced by overdischarging.

U.S. Pat. No. 5,230,074, issued on Jul. 20, 1993 and entitled "Battery Operated Computer Power Management System," discloses a technique using a second DC/DC converter in addition to a main DC/DC converter. This second DC/DC converter is a step-up DC/DC converter for supplying a system voltage from a backup battery which provides a voltage lower than the system voltage. This is unlike the main DC/DC converter, which is a step-down converter. The second DC/DC converter enables adequate power to be supplied to a dynamic random access memory when the main battery is removed for replacement. This patent does not teach the use of a second DC/DC converter which is capable of operation in conjunction with the main battery in an alternate power conservation mode.

SUMMARY OF THE INVENTION

The present invention solves the above and other problems and provides a power-supply control system for a portable data processor and a method of operation that includes two separate DC/DC converters, one for a suspend operation mode and one for a normal operation mode.

Each battery terminal is provided with a low voltage cut-off circuit to prevent the battery from being overdischarged. If a main battery is not connected to the system, or the main battery is below a threshold voltage, the data processor operates in a low power consumption mode to reduce the discharge of the main battery. A software-controlled suspend resume switch may be used to control the operation mode, reducing the number of required power switches.

DETAILED DESCRIPTION OF THE PRESENTLY PREFERRED EMBODIMENTS

Figure 1:
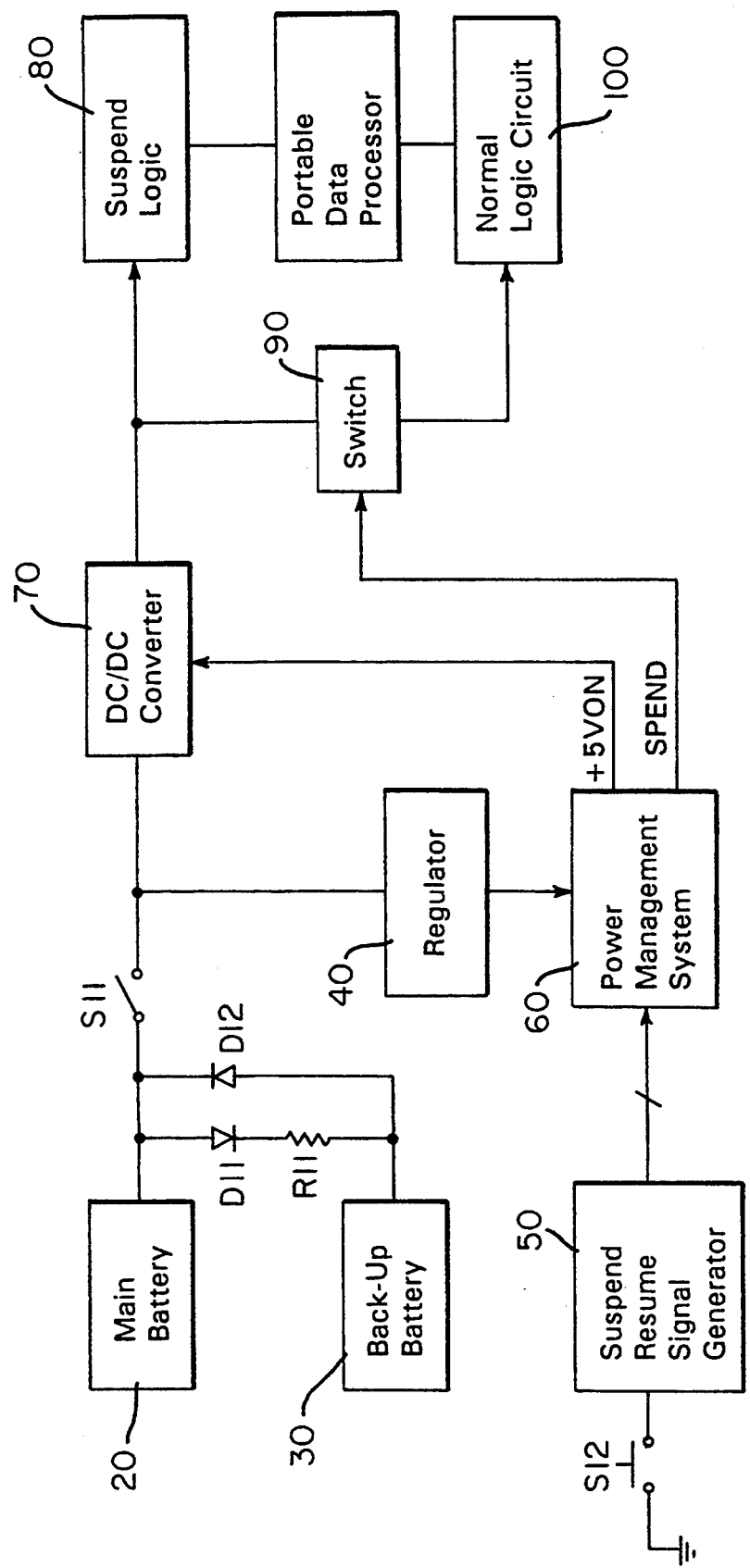
FIG. 1 is a circuit diagram of a known power-supply control system used in a conventional portable data processor.
Figure 2:
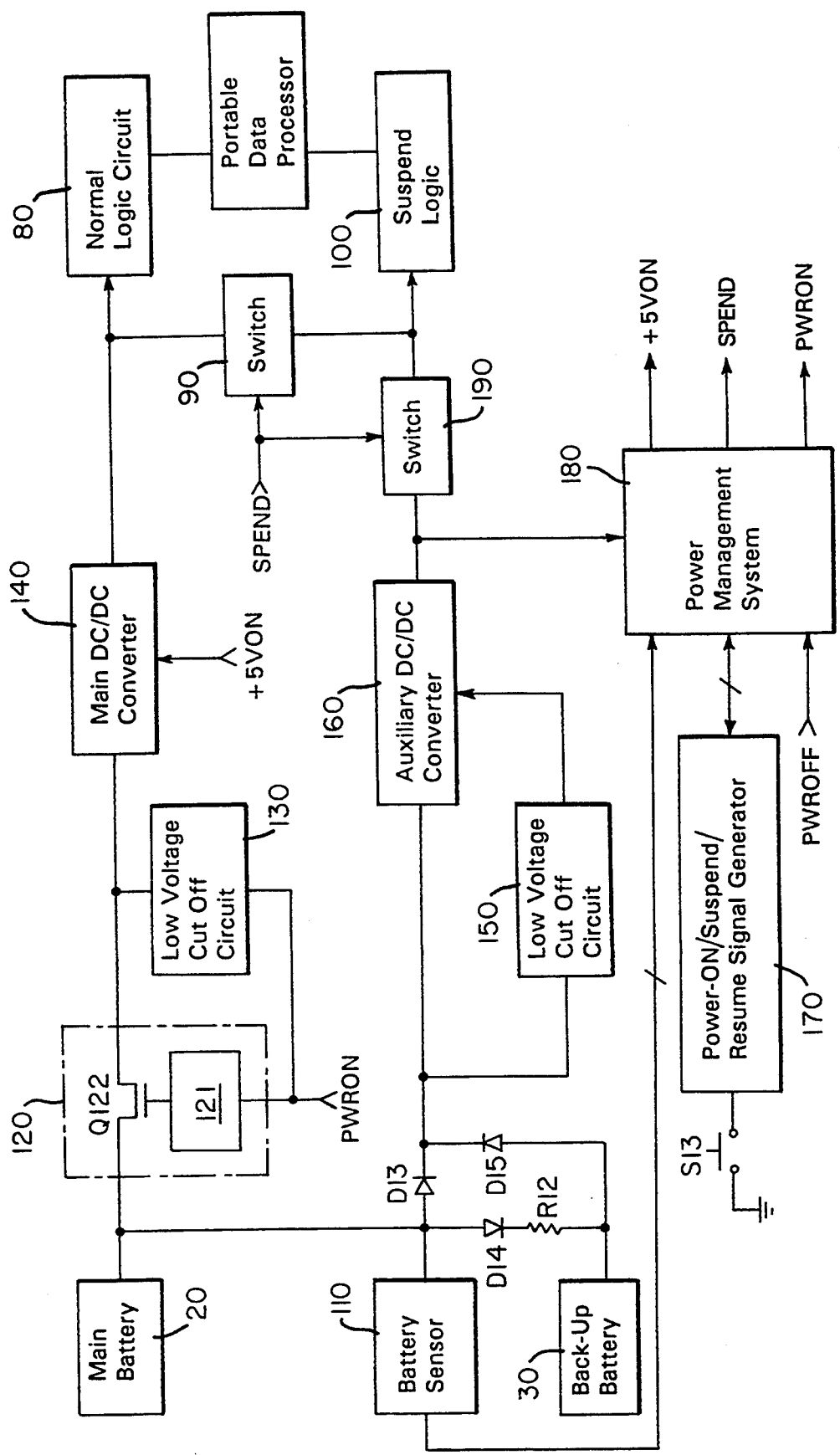
FIG. 2 is a circuit diagram of a power-supply control system for a portable data processor in accordance with a preferred embodiment of the present invention.

Referring to FIG. 2, a power-supply control system for a portable data processor according to the present invention is shown. Battery sensor 110 has an input terminal connected to an output terminal of a main battery 20. Diode D14 and resistor R12 are connected in series between the input of battery sensor 110 and a back-up battery 30. Diode D13 has its anode connected to the main battery 20 and battery sensing part 110, and diode D15 has its cathode connected to the cathode of diode D13 and its anode connected to the back-up battery 30. A low voltage cut-off circuit 150 has its input terminal connected to the cathodes of diode D13 and D15, and provides its output to a first input of an auxiliary DC/DC converter 160. A second input terminal of converter 160 is connected to the cathodes of diodes D13 and D15.

A power/suspend/resume converting switch S13 is provided which has one terminal grounded, and another terminal connected to the input of a power-on/suspend/resume signal generator 170. A power management system 180 receives inputs from the power-on/suspend/resume signal generator 170, the battery sensor 110, the auxiliary DC/DC converter 160, and power off signal PWROFF.

Switch 120 has an input terminal connected to an output terminal of the main battery 20 and an output signal line (PWRON) of the power management system 180. Low voltage cut-off circuit 130 feeds back the output of the switch 120. Main DC/DC converter 140 receives the output of the switch 120 and the output signal line +5 VON from the power management system 180. Normal logic circuit 80 receives input from the output terminal of the main DC/DC converter 140, and switch 90 receives input from the output terminal of the main DC/DC converter 140 and an output signal line SPEND of the power management system 180. Switch 190 has an input terminal connected to an output terminal of the auxiliary DC/DC converter 160 and to signal line SPEND output by the power management system 180. Suspend only logic circuit 100 has its input connected to the output terminals of 90 and 190.

Figure 3:
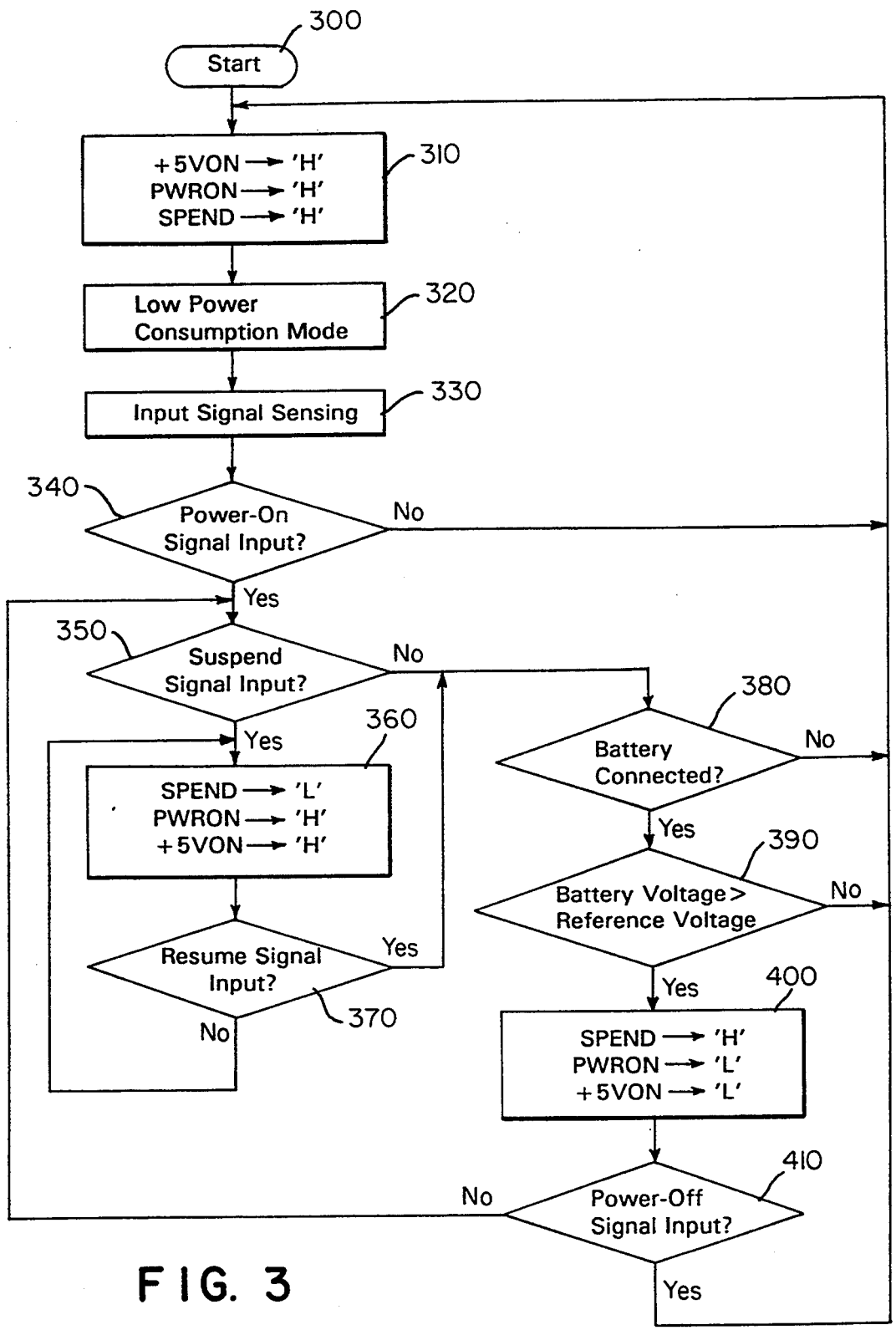
FIG. 3 shows the method of operating the power-supply control system of the present invention.

Referring now to FIG. 3, a method for driving the power-supply control system of the present invention is shown.

If the power is supplied by installing the main battery 20 and/or back-up battery 30 in the system, the power-supply control system of the portable data processor operates according to the following method, which may be programmed and stored in a memory portion of power management system 180.

Operation of the power supply system 180 begins in an initial state 300, when power is supplied to the data processor via main DC/DC converter 140 and normal logic circuit 80, and via auxiliary DC/DC converter 160 and suspend only logic circuit 100. When a power off signal PWROFF is received, the power management system 180, in step 310, generates signals of a logic "high" level on lines +5 VON, PWRON, and SPEND. When this combination of signals is generated, switches 120 and 190 are disabled (turned off) and switch 90 is enabled (turned on), and the system operates in a low power consumption mode. In this state, main DC/DC converter 140 is cut off from main battery 20 by disabled switch 120, and suspend only logic circuit 100 is cut off from auxiliary DC/DC converter 160 by disabled switch 190, and the data processor receives no power.

In this presently preferred embodiment, switches 90 and 190 should be selected and configured such that, when the signal on line SPEND is at a logic high level, switch 90 is enabled and switch 190 is disabled. Similarly, when the signal on line SPEND is at a logic low level, switch 90 should be disabled and switch 190 should be enabled. However, it will be appreciated by those of ordinary skill in the art that modifications may be made to the flow chart and the arrangement of switches in accordance with the present invention.

The low power consumption mode is maintained in step 320, and in step 330, the power management system 180 senses whether an input signal is being generated by power-on/suspend/resume generator 170. In step 340, the power management system 180 determines whether a power-on signal is being generated by generator 170. If not, the low power consumption mode is maintained until a power-on signal is received by the power management system 180.

Referring back to FIG. 2, a power-on signal is generated by power-on/suspend/resume signal generator 170 if the user operates the switch S13 when the power management system 180 is operating in the low power consumption mode. A suspend signal is generated if the user operates the switch S13 after the power-on signal or resume signal has been generated by the power management system 180; i.e., when the power management system is operating in the normal mode. A resume signal is generated if the user operates the switch S13 when the power management system 180 is operating in the suspend mode.

Referring again to FIG. 3, if a power-on signal is received by the power management system 180 in step 340, the system 180 then proceeds to determine whether a suspend signal is being generated by signal generator 170 in step 350. If the user stops working on the data processor for a predetermined period of time after the power-on signal is generated, or operates the converting switch S13 when the system is operating in the normal mode, a suspend signal is generated by signal generator 170 and provided to the power management system 180.

According to step 360, when the suspend signal is received by the power management system 180, logic "high" signals are generated on lines PWRON and +5 VON, and a logic "low" signal is generated on line SPEND. In this state, switch 120, and thus main DC/DC converter 140, are disabled. Also, switch 190 is enabled and switch 90 is disabled. Accordingly, power is supplied to the data processor via auxiliary DC/DC converter 160 such that the processor operates in a suspended mode. It should be noted that auxiliary DC/DC converter 160 is a converter having a low power capacity, and is therefore a considerably more efficient power supply when the load is small. During this suspended mode of operation, the data processor is driven only by suspend only logic circuit 100, and the power supply to normal logic circuit 80 is cut off so that power consumption is kept to a minimum. This mode of operation increases the life span of the main and backup batteries 20 and 30.

In step 370, the power management system 180 waits for a resume signal to be generated by generator 170. Until it receives a resume signal from generator 170, power management system 180 maintains the suspended mode of operation. Signal generator 170 provides a resume signal to power management system 180 if the user turns on or turns off converting switch S13 when the data processor is in the suspended mode.

If a suspend signal is not received by the power management system 180 in step 350, or if a resume signal is received by power management system 180 after the data processor has been in a suspended mode of operation, the power management system 180 in step 380 determines whether the main battery 20 is connected. If the battery is not connected to the data processor in step 380, the power supply system is returned to the low power consumption mode. If the battery is connected to the data processor in step 380, the power management system, in step 390, determines whether the battery voltage level is higher than a predetermined threshold level. If the battery voltage level is too low, indicating that the battery may be in danger of overdischarge, the power supply system is returned to the low power consumption mode. If the battery voltage level is higher than the reference voltage level, the power management system in step 400 generates a logic "high" suspend signal on line SPEND, and a logic "low" level on lines PWRON and +5 VON. This combination of signals results in a normal mode of operation, where switches 120 and 90 are enabled, and switch 190 is disabled. In this state of operation, power output by the main DC/DC converter 140 is supplied to the normal logic circuit 80 and the suspend only logic circuit 100. It should be noted that the main DC/DC converter 140 is a converter having a relatively large capacity, such that its efficiency is high when the load is large.

During the normal mode of operation, in step 410, the power management system 180 determines whether a power-off signal PWROFF is being generated by signal generator 170. If power-off signal PWROFF is received, the power management system 180 is returned to the low power consumption mode. If the power-off signal PWROFF is not received, the power management system returns to step 350, and if no suspend signal is received, and the battery is connected and providing sufficient power, the normal mode of operation continues.

The power-off signal PWROFF may be selected by the user and implemented by software. Such an implementation reduces the number of switches required by the power control system. Alternatively, the power-off signal PWROFF may be generated by a mechanical switch or other means.

If the voltage level of main battery 20 or backup battery 30 drops below a threshold level, low voltage cut-off circuits 130 and 150 are connected such that switch 120 is disabled or auxiliary DC/DC converter 160 is disabled to prevent overdischarge. If the operation of DC/DC converter 160 is suspended, the operation of the power management system 180 is also suspended. If the main battery and backup battery 20 and 30 are replaced, the battery voltage level will be sufficiently high that the power management system will operate again as described above.

According to the preferred embodiment of this invention, the power-supply control system of the portable data processing apparatus operates in a suspended operation mode and a normal operation mode, in order to enhance the efficiency of power use. Moreover, low voltage cut-off circuits are provided to each battery terminal in order to prevent the main battery or back-up battery from being overdischarged. If the main battery is not connected to the system or the main battery is below reference voltage, the operation mode is returned to the low power consumption mode to reduce the discharge of the main battery.

The function of turning power on is performed by a suspend resume switch, and the function of turning power off may be performed by software, so as to reduce the number of power switches.

While this invention has been described with reference to the presently preferred embodiments, it is to be understood that the invention is not limited to the disclosed embodiments, but, on the contrary, is intended to cover various modifications and equivalent arrangements included within the spirit and scope of the appended claims.

What is claimed is:

1. A power supply system for a portable data processor, comprising:

a first battery for supplying a first DC voltage;

a main converter selectively connected to said first battery in response to a first control signal, said main converter converting said first DC voltage to a second DC voltage, and being selectively enabled in response to a second control signal;

a normal logic circuit disposed between said main converter and said portable data processor;

an auxiliary converter connected to said main battery, said auxiliary converter converting said first DC voltage to a third DC voltage;

a suspend logic circuit having an input selectively connected to said auxiliary converter in response to a third control signal and an output connected to said portable data processor; and a power management system for providing said first and second control signals to enable said power supply system to operate in a low power consumption mode in which said main converter is disconnected from said battery, said main converter is disabled, and said suspend logic circuit is disconnected from said auxiliary converter, a suspended operation mode in which said main converter is disconnected from said battery, said main converter is disabled, and said auxiliary converter is connected to said suspend logic circuit, and a normal mode in which said main converter is connected to said battery, said main converter is enabled, and said auxiliary converter is connected to said suspend logic circuit.

2. The power supply system of claim 1, further comprising a user-operated signal generator for generating signals to select between said normal mode and said suspended operation mode.

3. The power supply system of claim 2, further comprising means for supplying a power off signal to said power management system, said power management system enabling said power supply system to operate in said low power consumption mode in response to said power off signal.

4. The power supply system of claim 1, further comprising first and second low voltage cut-off circuits for disabling said main converter and said auxiliary converter, respectively, if said DC voltage drops below a threshold level.

5. The power supply system of claim 4, wherein said battery and said main converter are selectively connected by a first switch, said first switch including a voltage pump circuit having an input for receiving said first control signal and an output of said first low voltage cut-off circuit, and an N-type metal oxide semiconductor field effect transistor connected between said battery and said main converter, said transistor having a gate terminal connected to an output terminal of said voltage pump circuit.

6. The system according to claim 1, wherein said main converter has a larger power capacity than said auxiliary converter, and operates at a higher efficiency than said auxiliary converter at higher voltage loads.

7. The system according to claim 1, further comprising a mechanical switch for selectively causing said power supply system to operate in said low power consumption mode.

8. The system according to claim 1, further comprising a backup battery for supplying said DC voltage if said first battery is unable to produce a DC voltage above a threshold level.

9. A method for controlling a power supply system of a portable data processor comprising the steps of:

supplying power in a first mode from a voltage source supplying a DC voltage above a threshold level to said data processor via a first path including a main DC/DC converter connected to said voltage source and a normal logic circuit connected between said main DC/DC converter and said data processor and via a second path including an auxiliary DC/DC converter and a suspend logic circuit connected between said auxiliary DC/DC converter and said data processor;

cutting off power in a second mode from said voltage source to said data processor by disconnecting said main DC/DC converter from said voltage source, disabling said main DC/DC converter, and disconnecting said suspend logic circuit from said auxiliary DC/DC converter; and supplying power in a third mode from said voltage source to said data processor via a path including said auxiliary DC/DC converter and said suspend logic circuit.

10. The method of claim 9, further comprising the step of disabling said main DC/DC converter and said auxiliary DC/DC converter if said voltage source is unable to provide a DC voltage above said threshold level.

11. The method of claim 9, wherein said first mode occurs when a user inputs a power in signal and does not input a suspend signal, when said voltage source is connected to said power supply system, and said voltage source is capable of providing a DC voltage greater than said threshold level.

12. The method of claim 11, wherein said second mode occurs in response to a power off signal generated while said power supply system is operating in said first mode.

13. The method of claim 12, wherein said power off signal is generated by computer software.

14. The method of claim 13, wherein said power off signal is generated by a mechanical switch operated by said user.

15. The method of claim 12, wherein said third mode occurs when said user inputs said suspend signal.

* * * * *